Sept. 27, 1932.   A. F. HANSON   1,879,217
WELDING MACHINE
Filed Aug. 8, 1929   3 Sheets-Sheet 1
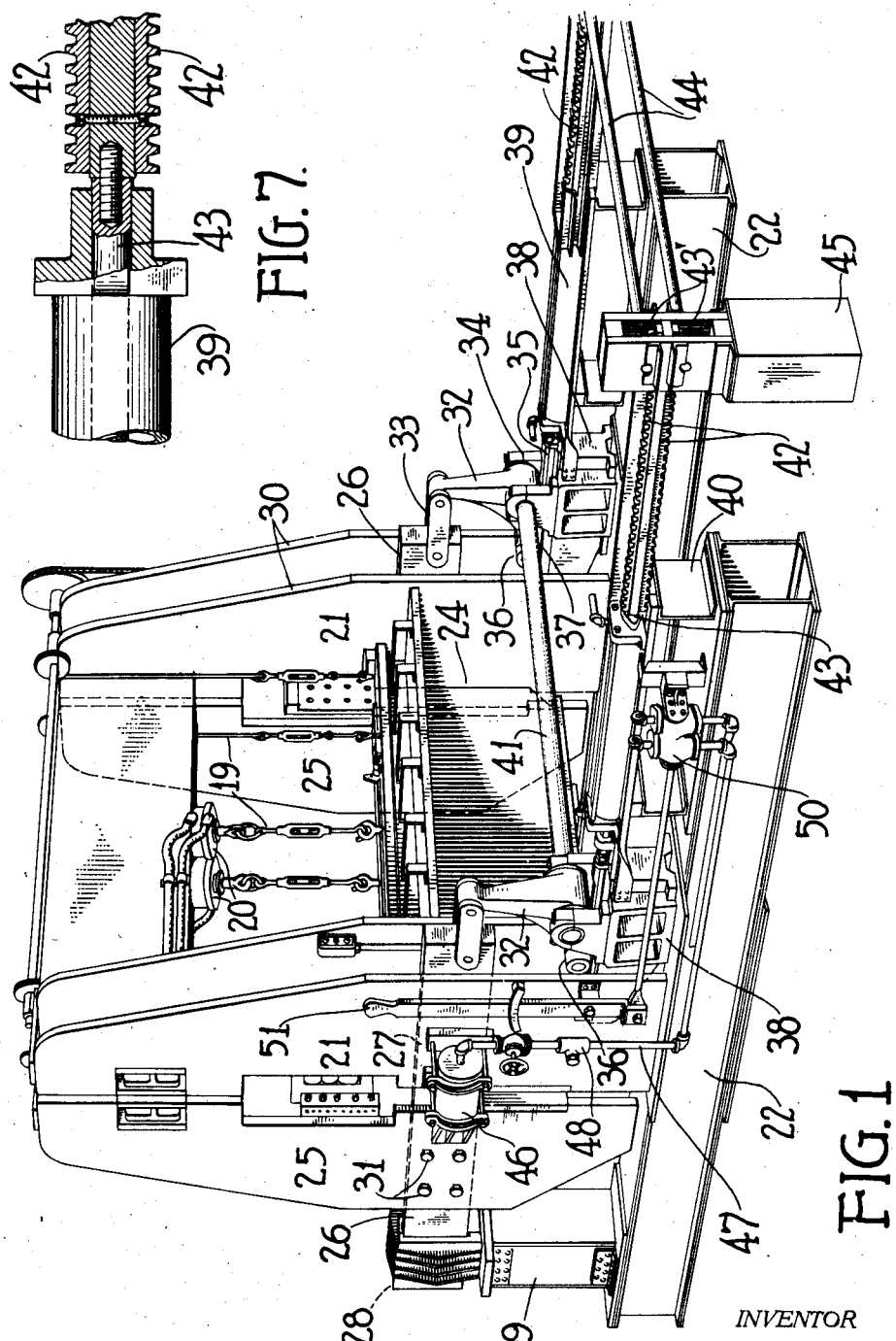
INVENTOR
ARTHUR F. HANSON.
BY
John P. Fairbox
ATTORNEY Sept. 27, 1932.  A. F. HANSON  1,879,217
WELDING MACHINE
Filed Aug. 8, 1929   3 Sheets-Sheet 2
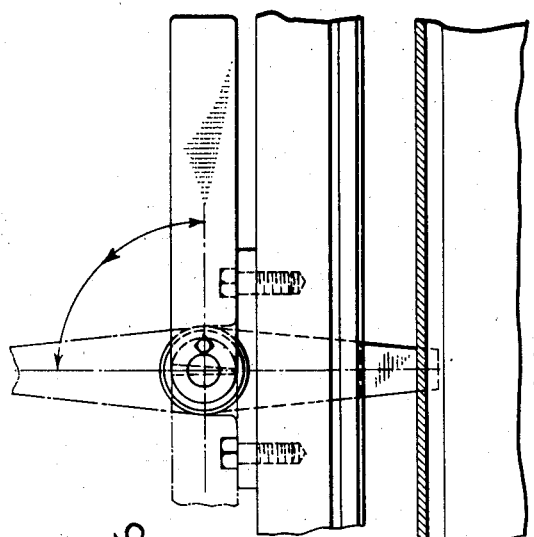
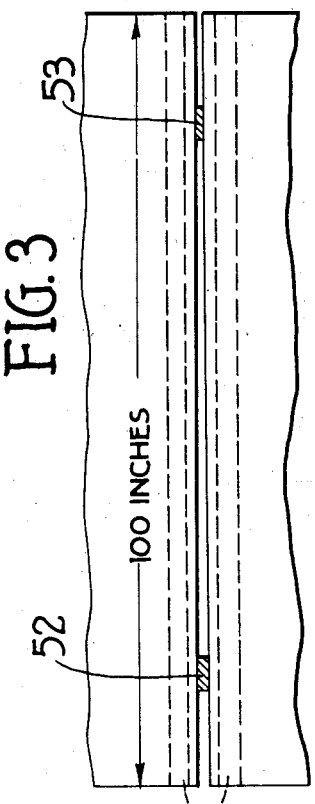
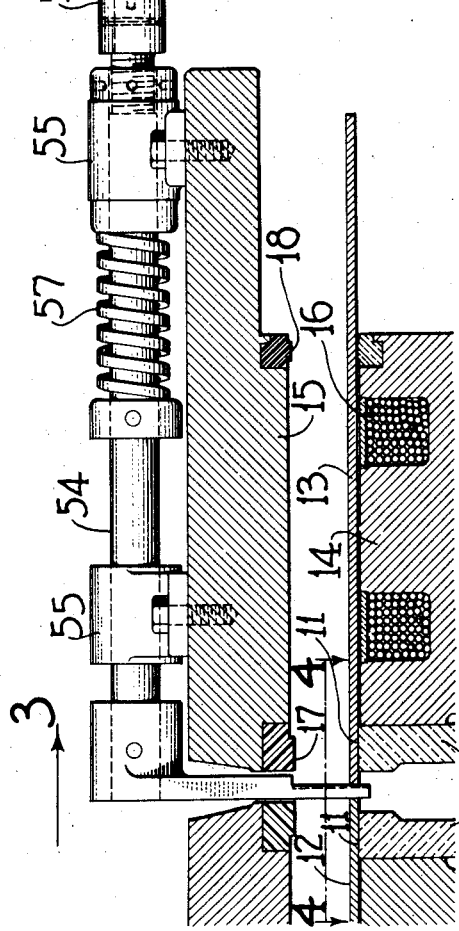
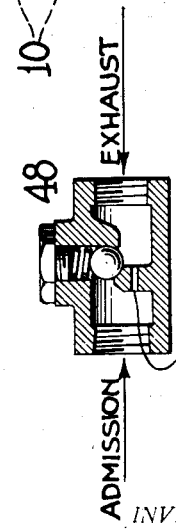
INVENTOR.
ARTHUR F. HANSON.
BY
ATTORNEY

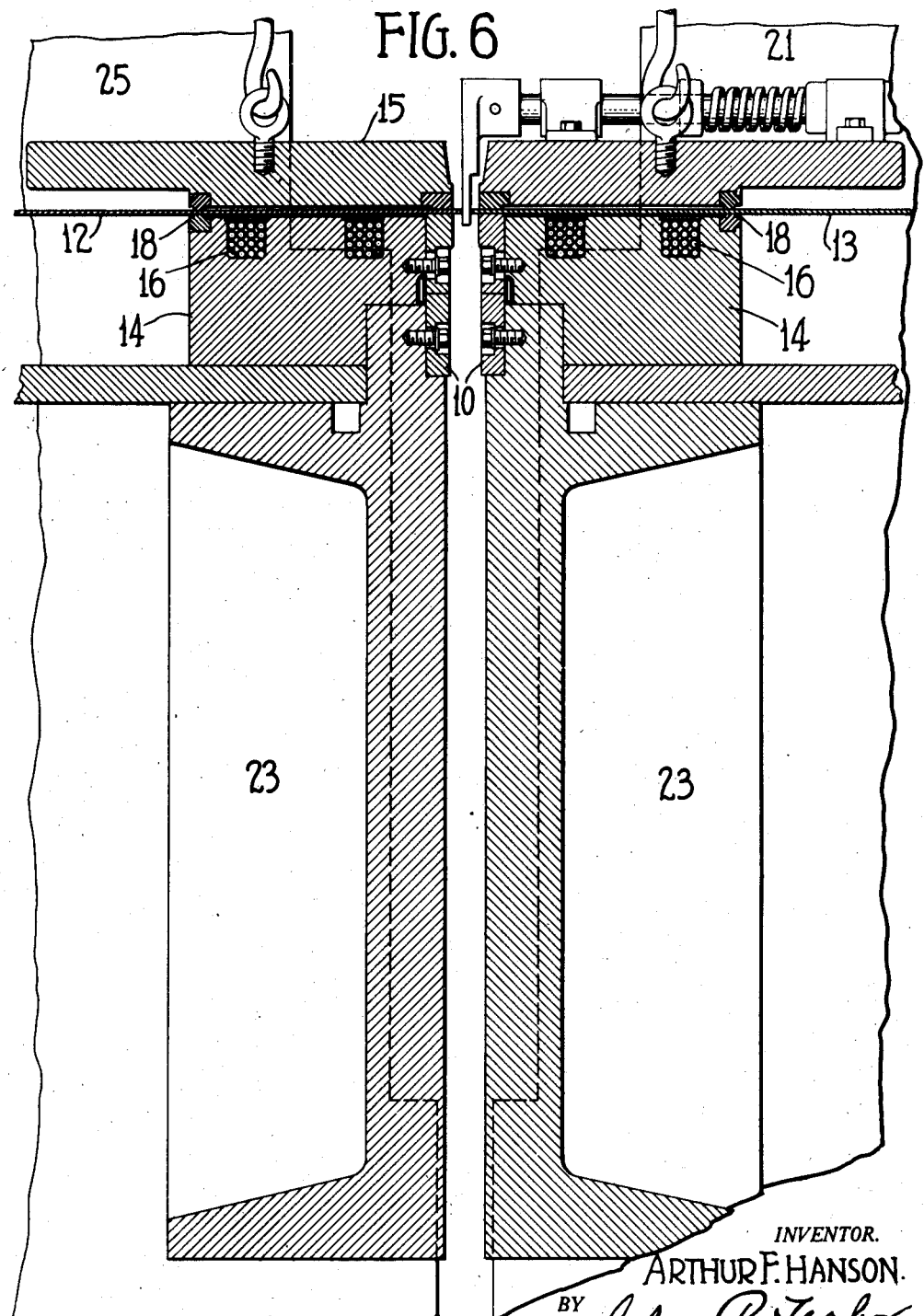

Patented Sept. 27, 1932

1,879,217

UNITED STATES PATENT OFFICE

ARTHUR F. HANSON, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

WELDING MACHINE

Application filed August 8, 1929. Serial No. 384,430.

The welding machine of my invention enables me to flash weld successfully extremely long seams.

Outstanding features of the machine are the employment of transversely elongated welding dies, multiple motors applying power to the dies at points spaced transversely apart to move them toward and from each other, parallel movement mechanism between the motors and the dies to insure uniform movement of the dies by the motor, motion synchronizing devices between the motors themselves to synchronize the movements thereof, interdie gauges engageable by opposed parts of the work to appropriately position the same with respect to each other so as to regularly and controllably develop the arc and the amount of flash, cams between the opposed motors of the dies giving the approach movements and recedable by the motors independently of the dies, and receding motors for the dies separate from the approach motors, and imparting to the dies a speed of recession less than the speed of recession of the cams.

The reasons a machine of these features is of especial utility in welding long seams, and the full spirit and range of adaptation of my invention will be rendered apparent by the disclosure of a specific embodiment.

In the accompanying drawings,

Figure 1 is a general three quarters side perspective of the machine embodying my invention.

Figure 2 is a transverse section through the welding dies and associated electromagnetic clamps showing one of the interdie gauges.

Figure 3 is a side elevation of this gauge looking in the direction of the arrow 3 in Figure 2.

Figure 4 is a small sized sectional plan view in the plane designated 4—4 of Figure 2.

Figure 5 is a section of one of the control valves of the die receding motor.

Figure 6 is a central transverse section of the main beams and dies and clamps supported thereby.

Figure 7 is a detail section of one of the motor synchronizing connections.

The opposed welding dies are designated 10 in Figure 2. They are transversely greatly elongated, in some cases approximating one hundred inches in transverse length. They engage by their upper faces 11 and supply welding current to the opposed parts of the work to be welded shown in the form of thin flat stock metal sheets 12 and 13. Thus, flat stock metal sheets one hundred inches in length may be supplied with welding current. Such sheets are indicated generally in Figure 4 and the transversely elongated dies 10 are shown in dotted lines.

Rigidly connected with the dies are electromagnetic clamps comprising main bodies 14 and armatures 15. Clamps are energized by winding 16 set into the main bodies 14. The armatures are separated from the main bodies 14 by the work 12—13 and clamp the work in spaced and restricted areas 17 and 18, the one juxtaposed to the faces 11 of dies 10 and the other to the opposite margin of the body 14 of the clamp. The armatures are bodily receded from and lowered to the work by a hoisting system designated generally 19 in Figure 1 and operated by fluid pressure motors 20. When in raised position, these armatures permit free insertion of the work 12—13 between them and the bodies 14 of the clamp, and free progress of the completed work from the machine through the same space. When lowered and the windings 16 are energized, they effectually rigidly clamp the work in place against the bases 11 of the dies against movement relative to the dies in any direction and in any degree. But my invention is directed not to the clamps but to the movements and adjustments of the dies and the work.

One die 10 is fixedly carried from the fixed vertically extending pillars 21, (Fig. 1) which rise rigidly from the bed beams 22 of the machine. These pillars 21 are spaced apart a distance somewhat greater than the length of the elongated dies, one hundred inches for example, and support the fixed die by means of a connected transverse frame-work 23 only the top of which appears in Fig. 1 and the body of which is located in the region designated 24. These frames 23, of course, likewise support the rigidly connected main bodies 14 of the clamps. They are preferably of conducting non-magnetic material and constitute one terminal of the welding circuit not shown.

The other die 10 is supported by the relatively movable pillars 25, also vertically extending and of similar form to the fixed pillars 21. The support is in all respects similar to the support of the fixed die, that is to say, by means of transverse interconnecting frame 23—24 of the same characteristics as that between the fixed pillars 21. But pillars 25 are mounted rigidly upon longitudinally extending reciprocable beams 26. These beams are massive. One end of each is borne in guideways 27 in the fixed pillars 21, the other end of which is borne in guideways 28 at the top of supporting pillars 29, which like the pillars 21 are rigidly connected with the bed beams 22. Only one of these pillars 29 is shown on the near side of the machine as illustrated but it is to be understood that the other is symmetrically placed in the opposite side of the machine. Each of the pillars 21—25 is of a duplex construction comprising two spaced massive plates 30 interconnected by any suitable means (not shown). The beams 26 pass through the body of the pillars 21—25 as clearly appears in Fig. 1 and between the plates 30. Pillars 25 are connected rigidly thereto by bolts 31 or otherwise.

The means for approaching the dies 10 toward each other acts directly on the beams 26. It comprises a pair of bell cranks 32 connected by links 33 one at each of the beams 26 on the end borne by pillars 21. These bell cranks are carried in bearings 34 supported from the bed beams 22. The bell cranks are actuated by cams 35 which underlie them and engage the inwardly projected followers 36. These cams are reciprocating cams borne on guideways 37 supported from bearing blocks 38. Guides, cams, followers and bell cranks lie in the vertical plane of the beams 26. Cams 35 are reciprocated by hydraulic motors 39 supported in rectilinear alignment with them by supporting brackets 40 carried by the bed beams 22. Fluid for operating them is supplied from any suitable source not shown.

Bell cranks 32 and links 33 are converted into a parallel movement mechanism by mounting the bell cranks upon a massive common transverse shaft 41 which constitutes pivotal support for the bell cranks 32 in the bearings 34. Except for the spring of the massive shaft 41 (and this spring is relatively small with power choice of dimension), they must move in perfect synchronism irrespective of the differential resistance presented by the respective beams 26 due to varying mechanical and electrical conditions in the machine beyond them.

The motor synchronizing mechanism is connected with the outboard ends of the motors 39. It comprises racks 42 connected respectively with the outwardly extended pistons 43 of the motors. The racks are duplexed for each motor 39 and are connected together transversely through the duplex pinions 43' and the duplex transversely extending shaft 44. In this manner the operating motors are required to operate in synchronism and to equalize the loads upon them. Only one pair of pinions 43' is shown fully in its fixed pedestal mounting 45, but it is to be understood that another pair is provided on the opposite side of the machine in connection with the racks 42 and shaft 44 at that end.

The mechanism for receding the dies 10 from each other comprises fluid pressure motors 46 the oppositely moving elements of which are respectively anchored to the respective pillars 21—25 on opposite sides of the machine substantially in the horizontal plane of beams 26. Only one of these members is shown on the near side of the machine as illustrated in Fig. 1, but it is to be understood that there is a similar motor on the opposite side. In each of the fluid pressure admission lines 47 for operating these motors, there is provided a check valve 48 shown in detail in Fig. 5 which opens when the motor is to be exhausted incident to the approach of the dies and closes when operating fluid is to be admitted to approach the dies under the action of motors 39 and cams 35, as indicated by the legends applied to Fig. 5 in connection with the arrows. But though the valve 48 closes against general admission of fluid, fluid is admitted restrictedly through a small port 49 bi-passing the check valve proper. The size of this port is so regulated that the receding operation of motors 46 is retarded in such measure that bell cranks 32 and followers 36 are retarded behind the receding movement of the cams 35 under the action of the reverse movement of fluid pressure motors 39. Motors 39 and 46 are commonly governed from control valve 50 operated by lever 51 on the side of the machine. The arrangement is such that when fluid pressure is admitted for operating the die approach motors 39, it is exhausted from the die receding motors 46, and that when it is admitted to the die receding members 46, it is admitted to the fluid pressure approach motors 49 for the purpose of receding the cams 35.

The interdie gauges for the adjustment of the work in the machine are designated 52 and 53. The one is thicker than the other, thereby when the work 12—13 is held upon the faces 11 of the dies 10 and over the faces of the clamps 14, the edges are adjusted in divergent relation to each other when brought to bear upon the opposite faces of the gauges 52—53. These gauges are in the form of arms and are projected in a medial plane of the dies 10 vertically of the machine. They project downwardly from above. Above they are supported pivotally on the shafts 54 borne in bearings 55 on the armatures 15 of the clamps. So borne, they may be oscillated by handles 56 into and out of work engaging position between the dies 10. They are biased by springs 57 connecting one end with a bearing 55 and the other end in shaft 54.

The machine possessing these features of adjusting control and operating mechanism proves a very superior machine for operating upon extremely long seams. The gauges, swung down into position as the work is moved into place, are engaged by the edges of the work and accurately position these edges with respect to each other divergently, so as to properly relate them for a perfect starting and continuation of the arc, and so as to avoid waste of material by undue burning off, and of course, to avoid irregularities and imperfections in the completed weld. Moved to position by hand, when the hand pressure is released, they automatically are released and borne upwardly to the dotted line position in Fig. 3 where they free the space between the parts 12—13 of the work for free movement of approach of the work in the dies. Such movement of approach is uniform throughout the length of the seam, indeed, throughout the extended transverse width of the machine. It is so irrespective of transversely a symmetrical resistance to movement giving rise to differential forces as between beams 26 at opposite ends of the machine, for these beams are firmly linked together through the parallel motion mechanism 33—32—41. The movement is the more uniform because fluid pressure motors 39 are prevented from a synchronous operation in which they might move one bell crank 32 ahead of the other, by means of the synchronizing mechanism of racks 42, pinions 43' and transverse shafts 44. Still further, any differential resistance of beams 26 which may, in spite of the parallel motion mechanism 33—32—41, make itself felt as between cams 35 and their followers 36, is met in a differential manner, incident to one approach motor 39 helping out the other as against its greater resistance through the synchronizing and equalizing mechanism 42—43—44. In other words, the motor 39 having the lower load helps out that having the higher load to a certain extent. On this account the loads on the transverse shaft 41 of the parallel motion mechanism are reduced and in these ways parallel motion mechanism and the motor synchronizing mechanism inter-act and assist each other. And by reason of the preliminary careful adjustment of the divergence of the work 12—13, through the gauges 52—53, there is initially and finally far less of differential resistance to movement as between beams 26 on opposite ends of the machine than otherwise. And finally, the weld having been completed and motors 46 being energized to recede the dies at the same time that motors 39 are energized to recede the cams 35, the retarding action of admission ports 49 causes cam followers 36 to lag behind the cams 35 thus relieving cams 35 of heavy pressure and permitting motors 39 to quickly retract them to their initial or starting positions of approach. The parallel motion and synchronizing mechanism in this movement of recession of dies and cams respectively, act of course, separately, the parallel motion mechanism to insure parallel receding movement of the dies, and the synchronizing mechanism to independently insure synchronous movement of receding of the cams 35.

Clearly the machine of my invention is possessed of especial merit in the field for which it is intended. That it will find utility in other fields and in other forms is not unexpected. Accordingly, all modifications which fall within its generic spirit are to be protected to me with the same surety as the particular form I disclose.

What I claim as new and useful and desire to protect by Letters Patent is:—

1. A welding machine comprising elongated opposed welding dies transversely relatively movable toward and from each other, a multiple number of motors applying power at longitudinally spaced points to one of the dies to feed it toward the other during the welding operation, and motion synchronizing devices between the motors to insure uniform movement of the die throughout its length.

2. A welding machine comprising elongated opposed welding dies transversely relatively movable toward and from each other, a multiple number of motors applying power at longitudinally spaced points to one of the dies to feed it toward the other during the welding operation, parallel movement mechanism insuring uniform movement of the die by the motors, and motion synchronizing devices between the motors.

3. A welding machine comprising opposed welding dies, a cam for approaching one die toward the other, a motor arranged to operate the cam having a determinate speed of cam recession, and a second motor arranged to recede the dies from each other whose operation is retarded behind the cam receding operation of the cam operating motor independently of the movement of the cams.

4. A welding machine comprising opposed welding dies, a cam for approaching one die toward the other, a motor arranged to operate the cam and having a determined speed of cam recession, a motor arranged for relatively receding the dies from each other, and means independent of the cams for retarding recession of the dies by this motor behind the recession of the cam.

5. In a welding machine, opposed welding dies relatively approachable and recedable from each other, and interdie gauges engageable by opposed parts of the work to position the same with respect to each other, and means for clamping the work in gauged position.

6. In a welding machine, opposed welding dies relatively approachable and recedable from each other, interdie gauges engageable by opposed parts of the work to position the same with respect to each other, and means for clamping the work in gauged position together with means to interpose and remove the gauges from between the dies.

7. In a welding machine, opposed welding dies relatively approachable and recedable from each other and a multiple number of spaced interdie gauges of divergent dimension to divergently position the work.

8. In a machine of the character described, transversely elongated welding dies relatively movable toward and from each other, parallel movement mechanism connecting the ends of one of the dies to insure uniform movement thereof toward the other die, and a multiple number of spaced inter-die gauges of divergent dimension to divergently position the work with respect to said dies.

9. In a machine of the character described, transversely elongated welding dies relatively movable toward and from each other, parallel movement mechanism connecting the ends of one of the dies to insure uniform movement thereof toward the other die, a multiple number of spaced inter-die gauges of divergent dimension to divergently position the work with respect to said dies, together with a cam for approaching one die toward the other, a member for operating the cam having a determinate speed of cam recession, a motor for receding the dies from each other, and means for retarding recession of the dies by this motor behind the recession of the cam.

In testimony whereof he hereunto affixes his signature.

ARTHUR F. HANSON.